United States Patent Office 3,463,771
Patented Aug. 26, 1969

3,463,771
CHROMIUM OR COBALT COMPLEXES OF MONO-AZO DYESTUFFS CONTAINING A TRIHALO-PYRIMIDYL GROUP
Jakob Benz, Oberwil, and August Schweizer, Muttenz, Switzerland, assignors to Sandoz Ltd. (also known as Sandoz AG), Basel, Switzerland
No Drawing. Continuation-in-part of application Ser. No. 588,630, Oct. 19, 1966. This application Aug. 9, 1967, Ser. No. 659,309
Int. Cl. C09b 29/36
U.S. Cl. 260—146                                      6 Claims

ABSTRACT OF THE DISCLOSURE

2:1-chromium and 2:1-cobalt complexes of a monoazo dyestuff of the formula $$\left[ v-\underset{w}{\overset{OH}{R_1}}-N=N-\underset{x}{\overset{OH}{R_2}}-z \right]-\underset{R_3}{N}\text{-trihalopyrimidyl} \quad (I)$$

wherein $R_1$ is a radical of the benzene or naphthalene series, $R_2$ is a radical of the naphthalene or 1-phenyl-3-methyl-5-pyrazolone series,
$R_3$ is hydrogen or lower alkyl,
$v$ is chlorine, —$SO_3H$, —$SO_2$—$NH_2$ or
—$SO_2$—$NH$—$CH_3$,
$w$ is hydrogen, nitro, —$SO_3H$ or acetylamine,
$x$ is hydrogen or chlorine,
$y$ is hydrogen, chlorine, methyl or acetylamino,
$z$ is hydrogen, —$SO_3H$ or —$SO_2NH_2$, and halo is Cl or Br, the —OH groups being bound in positions vicinal to the azo group, the monoazo dyestuff of Formula I containing 1 or 2 sulfonic acid groups, are suitable for dyeing, padding and printing a wide variety of fibers.

PYRIMIDINE DYESTUFFS

The present application is a continuation-in-part of application Ser. No. 588,630, filed Oct. 19, 1966, which application is in turn a continuation of application Ser. No. 813,681, filed May 18, 1959 (now abandoned).

It is known that water-soluble dyestuffs which contain at least one exchangeable hydrogen atom can be reacted in aqueous solution with six-membered triazine compounds containing at least two but not more than three exchangeable halogen atoms combined with carbon atoms. Depending upon the di- or trihalo -triazine chosen and the conditions of reaction, 1 or 2 halogen atoms of the triazine can be exchanged for radicals of the dyestuff molecule. It is also known that the remaining halogen atoms can be further reacted with compounds containing hydroxyl and amino groups, e.g. ammonia, methylamine, aniline, phenol or cellulose.

It has now been found that valuable new pyrimidine dyestuffs are obtained when water-soluble organic dyestuffs containing at least one exchangeable hydrogen atom in the molecule are reacted with 2,4,5,6-tetrahalopyrimidine in such a manner that the reaction product contains at least one trihalogenated pyrimidine ring.

The preferred 2,4,5,6-tetrahalopyrimidines are 2,4,5,6-tetrachloropyrimidine and 2,4,5,6-tetrabromopyrimidine as well as 5-bromo-2,4,6-trichloropyrimidine. Exchangeable hydrogen atoms of primary interest in this connection are those of the hydroxy and thiol groups or, preferably, those of the amino group which may be monosubstituted by alkyl, hydroxyalkyl and halogenalkyl radicals.

In the operation of the process, in which dyestuffs containing at least one exchangeable hydrogen atom are reacted with 2,4,5,6-tetrahalopyrimidine, the amino group is of special importance as a donor of exchangeable hydrogen atoms on account of its high reactivity.

Noteworthy dyestuffs of this type are, for example, water-soluble aminoazo dyes which contain coordinatively combined chromium or cobalt atoms.

Further chromium and cobalt containing dyestuffs suitable for the reaction with 2,4,5,6-tetrahalopyrimidine are those containing at least one reactive hydroxy group and those containing one reactive amino group which may be monosubstituted and one reactive hydroxy group. The amino group and the hydroxy group can be directly bound to aromatic nuclei of the dyestuff molecule or they can be indirectly attached to the dyestuff molecule over an aliphatic chain and if desired a bridge member. Noteworthy aliphatic chains are e.g.

—$CH_2$—, —$CH_2$—$CH_2$—, —$CH_2$—$CH_2$—$CH_2$—
—$CH_2$—$\underset{CH_3}{CH}$— and —$CH_2$—$CH_2$—$CH_2$—$CH_2$—

Representative members of the bridge members are

—$SO^2$—, —$CO$—, —$O$—, —$S$—,

—$SO_2$—$\underset{R'}{N}$—, —$CO$—$\underset{R'}{N}$—, —$NH$—$CO$—$NH$—, —$NH$—$COO$— or —$\underset{R'}{N}$— in which R' stands for hydrogen, low molecular alkyl or hydroxyalkyl, cycloalkyl, aryl or aralkyl, and R" stands for an acyl radical.

The preferred dyestuffs accordings to the present invention are the 2:1 chromium and 2:1-cobalt complex compounds of monoazo dyestuffs, the said metal complex compounds containing at least two acid-solubilizing groups and at least one trihalopyrimidyl radical bound through a nitrogen bridge, e.g. the 2:1-chromium and 2:1 cobalt complex compounds of monoazo dyestuffs of the formula $$\left[ v-\underset{w}{\overset{OH}{R_1}}-N=N-\underset{x}{\overset{OH}{R_2}}-z \right]-\underset{R_3}{N}\text{-trihalopyrimidyl} \quad (I)$$

wherein $R_1$ is a radical of the benzene or naphthalene series,
$R_2$ is a radical of the naphthalene or 1-phenyl-3-methyl-5-pyrazolone series,
$R_3$ is hydrogen or lower alkyl,
$v$ is chlorine, —$SO_3H$, —$SO_2$—$NH_2$ or
—$SO_2$—$NH$—$CH_3$,
$w$ is hydrogen, -nitro, —$SO_3H$ or acetylamino,
$x$ is hydrogen or chlorine,
$y$ is hydrogen, chlorine, methyl or acetylamino and
$z$ is hydrogen, —$SO_3H$ or —$SO_2$—$NH_2$, the —OH groups are bound in positions vicinal to the azo group and the monoazo dyestuff of Formula I contains 1 or 2 sulfonic acid groups and the group —$\underset{R_3}{N}$-trihalopyrimidyl is bound either to $R_1$ or to $R_2$.

Especially valuable are the 2:1-chromium and 2:1-cobalt complex compounds of the monoazo dyestuffs of the formulae $$\left[ \underset{R_4}{\overset{OH}{}}-N=N-\underset{R_5}{\overset{OH}{}} \right]-\underset{R_3}{N}\text{-trihalopyrimidyl} \quad (II)$$

and

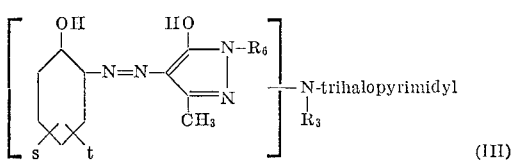

wherein

R₃ is hydrogen or lower alkyl,
R₄ is chlorophenylene, chloro-sulfophenylene, nitrosulfophenylene, sulfophenylene, disulfophenylene, aminosulfonylphenylene, methylaminosulfonylphenylene, sulfonaphthylene and nitrosulfonaphthylene,
R₅ is naphthylene, sulfonaphthylene and acetylaminosulfonaphthylene,
R₆ is phenyl, sulfophenyl, chlorosulfophenyl, dichlorosulfophenyl, methylchlorosulfophenyl and aminosulfonylphenyl,
$s$ is —SO₃H, —SO₂NH₂ or —SO₂—NH—CH₃ and
$t$ is H or —SO₃H, the monoazo dyestuffs of Formulae II or III contain 1 or 2 sulfonic acid groups, the —OH groups in Formula II are in positions vicinal to the azo group and the group

trihalopyrimidyl is bound to R₄ or R₅ in Formula II or to R₆ or to the hydroxyphenyl radical in Formula III.

The choice of diazo components for building dyestuffs of this type includes 2-amino-1-hydroxybenzenes, 1-amino-2-hydroxy- and 2-amino-1-hydroxynaphthalenes, and 2-amino-benzene-1-carboxylic acids. Examples of suitable coupling components 1-amino-)-aryl-5-pyrazolones, aminohydroxynaphthalenes and their monosulfonic acids e.g. 1-amino-7-hydroxynaphthalene or 2-amino - 5 - hydroxynaphthalene-7-sulfonic acid.

The reaction with 2,4,5,6-tetrahalopyrimidine of the water-soluble dyestuffs used as starting materials is conducted preferably in aqueous medium. The halide can be applied in concentrated form or dissolved in an organic solvent. Solvents specially suitable for halopyrimidines are acetone, benzene, chlorobenzene and toluene.

The temperature of reaction is governed by the reactivity of the individual starting materials. If temperatures higher than about 40° C. are necessary, it is advisable in view of the volatility of halopyrimidines in water-steam to work with vessels fitted with reflux condensers.

The reaction is carried out in a weakly alkaline, neutral or weekly acid medium, preferably in the pH range of 9 to 3. To neutralize the hydrogen halide so formed an acid-binding agent, e.g. sodium acetate, is added to the reaction solution at the start of the operation, or, if preferred, small portions of sodium or potassium carbonate of sodium or potassium bicarbonate in solid powdered form or as a concentrated aqueous solution are added in the course of the reaction. Aqueous solutions of sodium or potassium hydroxide are other suitable neutralizing agents. The addition of small amounts of a wetting or emulsifying agent to the reaction mixture can accelerate the rate of reaction.

The reaction is so controlled that only one halogen atom of the 2,4,5,6-tetrahalopyrimidine reacts with an exchangeable hydrogen atom. Hitherto it has not been possible to determine which of the halogen atoms participates in the reaction or whether it is equally probable that any one of the isomeric forms will be formed.

On completion of condensation, the pyrimidine dyestuff is precipitated from the solution or suspension, which may be previously neutralized, with sodium or potassium chloride or with acid, whereupon it is filtered with suction, washed and dried.

The water-soluble dyestuffs of the invention are well soluble in water and give padding liquors and printing pastes stable to storage. They are therefore suitable for the dyeing, padding and printing of fibers of animal origin, e.g. wool and silk, of synthetic polyamide fibers, e.g. nylon, of leather, of cellulose fibers, e.g. cotton, linen, and of regenerated cellulose fibers, e.g., viscose and cuprammonium rayon, as well as for mixtures of these fibers and materials in other forms. The optimum conditions of application vary depending on the type of fiber and the dyestuffs used.

The dyestuffs are dyed, padded, printed or fixed on cellulose fibers preferably in an alkaline medium, e.g. in presence of sodium carbonate or bicarbonate, sodium or potassium hydroxide solution, sodium metasilicate, sodium borate, trisodium phosphate, ammonia, etc. It is often an advantage to add a mild oxidizing agent such as sodium 1-nitrobenzene-3-sulfonate to the dyebath, padding liquor or printing paste, in order to preclude reduction effects. Normally, the dyestuffs are fixed on cellulosic fibers by heat treatment. Some of the dystuffs e.g. those which are combined through an oxygen atom to the trihalopyrimidine ring can be dyed or fixed at lower temperatures, e.g. 20–40° C., by using sufficiently strong alkalies such as sodium or potassium hydroxide or trisodium phosphate.

The dyeings and prints on cellulosic fibers possess a good fastness to light and excellent fastness properties to washing, water, sea water, cross dyeing, perspiration, pressing, alkali, e.g. sodium carbonate solution, soda boiling, acids, e.g. dilute acetic or phosphoric acid, vulcanizing, gas fumes and dry cleaning (organic solvents). In addition they are stable to acid and alkaline hydrolytic influences and to resin finishing treatments.

Animal and synthetic polyamide fibers are dyed and printed, or fixed, preferably in an acid, neutral or weakly alkaline medium, e.g. in presence of acetic, formic or sulfuric acid, ammonium sulfate, sodium metaphosphate, etc.

Dyeing can also be carried out in an acetic acid to neutral medium in presence of levelling agents, e.g. polyoxyethylated fatty amines or mixtures of the same and alkylpolyglycol ethers, the bath being adjusted to a weakly alkaline reaction on completion of dyeing with small amounts of an agent of alkaline reaction, e.g. ammonia, sodium bicarbonate or carbonate etc. or of compounds which react alkaline on heating, e.g. hexamethylene tetramine or urea. This is followed by thorough rinsing and acidifying with a little acetic acid if necessary.

In the dyeing and printing of fibers and other materials of animal origin and synthetic polyamides the linkage between the dyestuff molecule and the fiber is often less pronounced, due to the fact that some of the dyestuffs owing to their acidic character possess affinity for the fiber.

The dyeings and prints on wool and synthetic polyamide fibers possess good fastness to light, washing, water, sea water, milling, perspiration, pressing and dry cleaning.

In comparison with the next comparable dyestuffs with a dihalopyrimidylamino group the new dyestuffs possess a better fixation yield on cotton.

In the following examples the parts and percentages are by weight and the temperatures in degrees centigrade.

Example 1

55.65 parts of 2:1-cobalt complex compound of 1-hydroxy - 2 - (2'-hydroxy-5'-chlorophenylazo)-6-aminonaphthalene-3,3'-disulfonic acid (in form of the sodium salt) are dissolved in 600 parts of water at 60°. 22 parts of finely pulverized 2,4,5,6-tetrachloropyrimidine are added and the whole is vigorously stirred for several hours at 60–65°. The hydrogen chloride formed during the reaction is continuously neutralized by the even addition of a dilute sodium carbonate solution at a constant pH of 5 to 6. When the reaction is completed, which can be checked by chromatography, the pyrimidine dyestuff is precipitated by addition of sodium chloride and is filtered off and washed with dilute sodium chloride solution. It is dried in vacuo at 80° and is obtained as a dark powder which dissolves in water to give a brownish violet solution.

Mercerized cotton fabric is printed with a printing paste of the composition

|  | Parts |
|---|---|
| The above described dye | 30 |
| Urea | 100 |
| Water | 350 |
| 3% sodium alginate thickening | 500 |
| Sodium 3-nitrobenzenesulfonate | 10 |
| Sodium bicarbonate | 10 |
| Total | 1000 |

After drying the print is steamed for 3 minutes at 102–4°, then rinsed with cold and with warm water, treated for 20 minutes at the boil in a solution of 5 grams of soap per liter of distilled water, rinsed again and dried. The brownish violet print obtained is fast to light and to wet treatments and is about 300% stronger than a print obtained with the corresponding dichloropyrimidylamino dye (e.g. of U.S. Patent 3,288,777). Instead of sodium bicarbonate the same amount of calcined sodium carbonate can also be used.

Example 2

23.9 parts of 2-amino-5-hydroxynaphthalene-7-sulfonic acid and a 10% sodium hydroxide solution are added to 400 parts of water to give a solution of weakly acid reaction. 22 parts of 2,4,5,6-tetrachloropyrimidine are added and the reaction mixture stirred for several hours at 45–60°, a constant pH of 4.0 to 4.5 being maintained by dropwise addition of a dilute sodium carbonate solution. When the reaction is completed the mass is cooled to 5–10° and the diazo compound, obtained in the normal way by diazotizing 19 parts of 2-amino-1-hydroxybenzene-4-sulfonic acid, is added. A 20% sodium carbonate solution is added simultaneously in order to maintain the pH value at 6.5–7.0. When the coupling reaction is completed, the monoazo dye is salted out, filtered off and stirred in 500 parts of water at 80° and at this temperature 16 parts of cobaltous sulfate heptahydrate are added. The temperture is subsequently maintained at 94–96° for about 3 hours, a constant pH value of 5.0 to 6.0 being kept by dropwise addition of a dilute sodium carbonate solution. The dyestuff is precipitated by the addition of sodium chloride, filtered off, dried at 70° and ground to give a dark powder which dissolves in water with a violet-brown coloration.

By replacing the 22 parts of 2,4,5,6-tetrachloropyrimidine by 26.5 parts of 5-bromo-2,4,6-trichloropyrimidine or by 40 parts of 2,4,5,6-tetrabromopyrimidine very similar dyestuffs are obtained.

Mercerized cotton sateen is impregnated at 25° with a padding liquor containing per liter:

|  | Grams |
|---|---|
| The above described dye | 30 |
| Calcined sodium sulfate | 150 |
| Sodium Metasilicate | 30 |
| 30% sodium hydroxide solution | 20 |

The impregnated material is squeezed so that the pickup of liquor is about 75% of the weight of the dry material, wrapped in a sheet of plastic and stored for 48 hours at 25°. It is then rinsed with cold and with hot water, soaped for 15 minutes at the boil with a solution containing 0.3 gram of a carboxymethylated alkylpolyglycol ether and 0.5 gram of calcined sodium carbonate per liter, rinsed again and dried. The obtained violet-brown dyeing is fast to light and to wet treatments.

EXAMPLE 3

48.3 parts of the dyestuff sodium 1-hydroxy-2-(2'-hydroxyphenylazo)-6 - aminonaphthalene - 3,5' - disulfonate are stirred in 400 parts of water. At 80° 30 parts of crystallized sodium acetate and 30 parts of crystallized chromic potassium sulfate are added and the mixture is heated for 24 hours with reflux. Subsequently the dyestuff solution is cooled to 80°, 21.8 parts of 2,4,5,6-tetrachloropyrimidine are added and the mixture is stirred for a few hours at 80° with dropwise addition of 15% sodium carbonate solution to maintain the pH value at 5–5.5. On completion of condensation the dyestuff is salted out, filtered off, dried and ground; it is a dark powder which dissolves in water to give dark blue solutions.

A fabric of cotton is impregnated at room temperature with a 2% solution of the above dyestuff, squeezed to give an increase of about 75° C. on its dry weight and dried. The dyeing is treated for 30 minutes at 90 in an aqueous solution containing 2.7 grams of 30% sodium hydroxide solution and 300 grams of calcined sodium sulfate per liter. It is then rinsed with cold and with warm water, soaped for 15 minutes at the boil in 0.3% soap solution in distilled water, rinsed again and dried. The obtained reddish navy blue dyeing is fast to light and to wet treatments.

The following table contains further 2:1-cobalt or chrominum complex dyestuffs obtained according to the details of Examples 1 to 3. They are characterized by the diazo component, the coupling component, the metal and the shade of the dyeings on cotton.

TABLE

| No. of Example | Diazo component (I) | Coupling component (II) | Metal (III) | Shade on cotton (IV) |
|---|---|---|---|---|
| 4 | 1-amino-2-hydroxy-3-chlorobenzene-5-sulfonic acid. | 1-hydroxy-6-trichloro-pyrimidylamino-naphthalene-3-sulfonic acid. | Cr | Reddish navy blue. |
| 5 | 1-amino-2-hydroxy-3-chlorobenzene-5-sulfonic acid. | 1-hydroxy-6-trichloropyrimidylamino-naphthalene-3-sulfonic acid. | Cr | Do. |
|  | do | 2-hydroxy-8-acetyl aminonaphthalene | | |
| 6 | 1-amino-2-hydroxybenzene-5-sulfonic acid | 2-hydroxy-8-trichloropyrimidylaminonaphthalene. | Cr | Gray. |
| 7 | 1-amino-2-hydroxy-3-trichloropyrimidyl-aminobenzene-5-sulfonic acid. | 1-phenyl-3-methyl-5-pyrazolone-4'-sulfonic acid. | Co | Yellowish brown. |
| 8 | 1-amino-2-hydroxy-5-chlorobenzene-3-sulfonic acid. | 2-hydroxy-8-acetyl-aminonaphthalene | Cr | Reddish navy blue. |
|  | 1-amino-2-hydroxy-5-chlorobenzene-3-sulfonic acid. | 1-hydroxy-6-trichloro-pyrimidylaminonaphthalene-3-sulfonic acid. | | |
| 9 | 1-amino-2-hydroxy-5-chlorobenzene-3-sulfonic acid. | 1-hydroxy-6-trichloro-pyrimidylaminonaphthalene-sulfonic acid. | Cr | Navy blue. |
| 10 | 1-amino-2-hydroxy-3-chlorobenzene-5-sulfonic acid. | do | Co | Brownish-violet. |
| 11 | 1-amino-2-hydroxybenzene-3,5-disulfonic acid. | 2-hydroxy-8-tribromopyrimidylamino-naphthalene. | Cr | Gray. |
| 12 | 1-amino-2-hydroxy-5-nitrobenzene-3-sulfonic acid. | 1-hydroxy-6-trichloro-pyrimidylaminonaphthalene-3-sulfonic acid. | Cr | Reddish navy blue. |
| 13 | do | do | Co | Brown. |
| 14 | 1-amino-2-hydroxy-3-nitrobenzene-5-sulfonic acid. | 1-hydroxy-6-trichloro-pyrimidyl-aminonaphthalene-3-sulfonic acid. | Cr | Reddish navy blue. |
| 15 | do | do | Co | Brownish violet. |
| 16 | 1-amino-2-hydroxybenzene-3,5-disulfonic acid. | 2-hydroxy-8-trichloropyrimidylamino-naphthalene. | Cr | Gray. |

TABLE

| No. of Example | Diazo component (I) | Coupling component (II) | Metal (III) | Shade on cotton (IV) |
|---|---|---|---|---|
| 17 | 1-amino-2-hydroxy-3-nitrobenzene-5-sulfonic acid 1-amino-2-hydroxy-3-chlorobenzene-5-sulfonic acid. | 2-hydroxy-8-trichloropyrimidylaminonaphthalene. 1-hydroxy-6-trichloropyrimidylamino-naphthalene-3-sulfonic acid. | Cr | Reddish navy blue. |
| 18 | 1-amino-2-hydroxy-6-nitronaphthalene-4-sulfonic acid. | 1-hydroxy-6-trichloropyrimidylamino-naphthalene-3-sulfonic acid. | Cr | Greenish black. |
| 19 | do | do | Co | Reddish black. |
| 20 | 1-amino-2-hydroxy-naphthalene-4-sulfonic acid. | do | Cr | Navy blue. |
| 21 | 1-amino-2-hydroxy-benzene-5-sulfonic acid amide. | do | Cr | Reddish navy blue. |
| 22 | 2-amino-1-hydroxy-naphthalene-4-sulfonic acid. | do | Co | Black. |
| 23 | 1-amino-2-hydroxy-3-acetylaminobenzene-5-sulfonic acid. | do | Cr | Violetish brown. |
| 24 | 1-amino-2-hydroxy-3-trichloropyrimidyl-amino-benzene-5-sulfonic acid. | 1-(2'-chlorophenyl)-3-methyl-5-pyrazolone-4'-sulfonic acid. | Cr | Brownish orange. |
| 25 | do | 1-phenyl-3-methyl-5-pyrazolone-3'-sulfonic acide amide. | Co | Yellowish brown. |
| 26 | do | 1-(2'-methylphenyl)-3-methyl-5-pyrazolone-4'-sulfonic acid. | Cr | Orange. |
| 27 | 1-amino-2-hydroxy-3-trichloro-pyrimidyla-minobenzene-5-sulfonic acid. | 1-(2'-methyl-6'-chlorophenyl)-3-methyl-5-pyrazolone-4'-sulfonic acid. | Co | Yellowish brown. |
| 28 | 1-amino-2-hydroxy-3-trichloropyrimidyl-amino-benzene-5-sulfonic acid methylamide. | 1-phenyl-3-methyl-5-pyrazolone-3'-sulfonic acid. | Co | Do. |
| 29 | 1-amino-2-hydroxy-benzene-3,5-disulfonic acid. | 1-(3'-trichloropyrimidylaminophenyl)-3-methyl-5-pyrazolone. | Co | Do. |
| 30 | do | 2-hydroxy-8-trichloro-pyrimidylaminonaphthalene. | Cr | Gray. |
| 31 | 1-amino-2-hydroxy-3-chlorobenzene-5-sulfonic acid. | 1-hydroxy-6-(N-trichloro-pyrimidyl-N-ethyl-amino)-naphthalene-3-sulfonic acid. | Cr | Violetish brown. |
| 32 | 1-amino-2-hydroxy-benzene-5-sulfonic acid. | 1-hydroxy-6-(N-trichloro-pyrimidylamino-N-methylamino)-naphthalene-3-sulfonic acid. | Co | Reddish brown. |
| 33 | 1-amino-2-hydroxy-4-trichloropyrimidyl-amino-5-chlorobenzene. | 1-(2',5'-dichlorophenyl)-3-methyl-5-pyrazolone-4'-sulfonic acid. | Cr | Orange. |
| 34 | 1-amino-2-hydroxy-5-trichloropyrimidylamino-benzene-3-sulfonic acid. | 1-hydroxy-6-acetylaminonaphthalene-3-sulfonic acid. | Cr | Violetish brown. |
| 35 | do | 1-phenyl-3-methyl-5-pyrazolone-4'-sulfonic acid amide. | Co | Yellowish brown. |
| 36 | 1-amino-2-hydroxy-3-trichloropyrimidyl-amino-benzene-5-sulfonic acid amide. | 1-phenyl-3-methyl-5-pyrazolone-4'-sulfonic acid. | Co | Do. |
| 37 | 1-amino-2-hydroxybenzene-5-sulfonic acid methylamide. | 1-hydroxy-6-trichloropyrimidyl-aminonaphthalene-3-sulfonic acid. | Co | Reddish brown. |

Formulae of representative dyes of the foregoing examples are as follows:

EXAMPLE 1

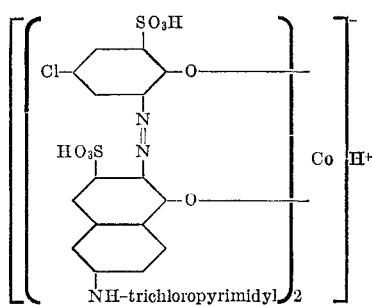

EXAMPLE 2

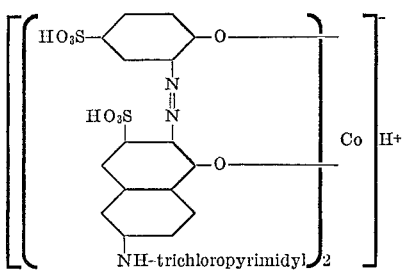

EXAMPLE 3

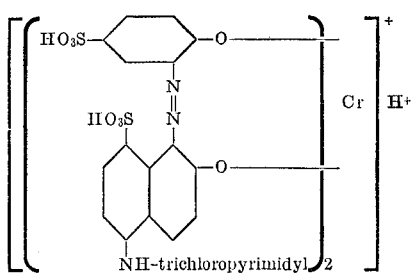

EXAMPLE 19

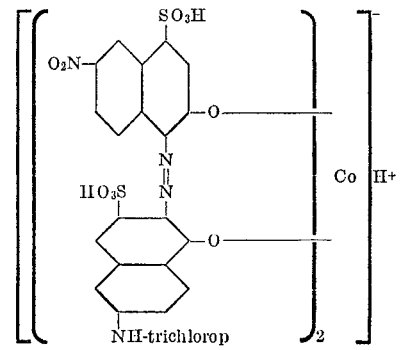

EXAMPLE 29

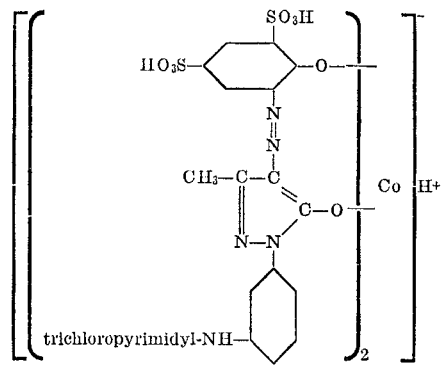

EXAMPLE 30

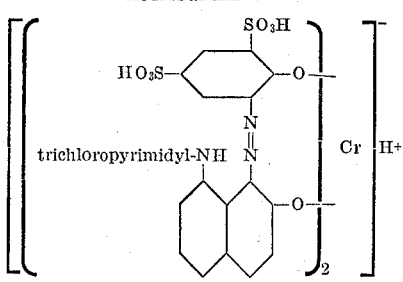

EXAMPLE 33

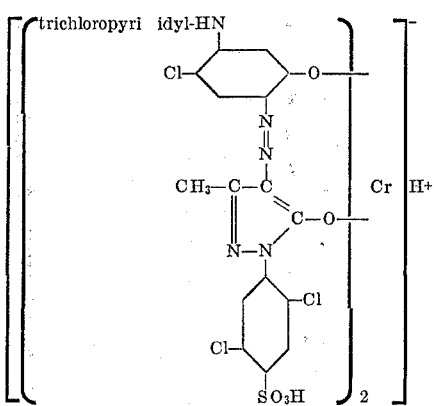

Having thus disclosed the invention what we claim is:
1. 2:1-chromium or 2:1-cobalt complex compound of a monoazo dyestuff of the formula

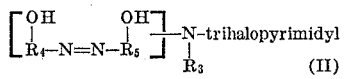

wherein
  $R_3$ is hydrogen or lower alkyl,
  $R_4$ is chlorophenylene, chlorosulfophenylene, nitrosulfophenylene, acetylamino-sulfophenylene, sulfophenylene, disulfophenylene, aminosulfonylphenylene, methylaminosulfonylphenylene, sulfonaphthylene or nitro-sulfonaphthylene,
  $R_5$ is naphthylene, sulfonaphthylene or acetylaminosulfonaphthylene, and
  halo is chloro or bromo, and
wherein the—OH groups are in positions vicinal to the azo group, and the monoazo dyestuff of Formula II contains 1 or 2 sulfonic acid groups.

2. 2:1-chromium or 2:1-cobalt complex compound of a monoazo dyestuff according to claim 1, of the formula

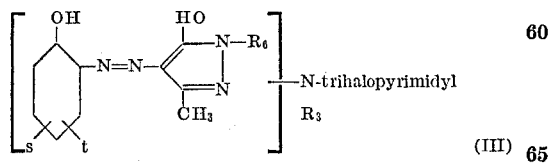

wherein
  $R_3$ is hydrogen or lower alkyl,
  $R_6$ is phenyl, sulfophenyl, chlorosulfophenyl, dichlorosulfophenyl, methylchlorosulfophenyl or aminosulfonylphenyl,
  $s$ is —$SO_3H$, —$SO_2$—$NH_2$ or —$SO_2$—NH—$CH_3$,
  $t$ is H or —$SO_3H$, and halo is chloro or bromo, and
wherein the monoazo dyestuff of Formula III contains 1 or 2 sulfonic acid groups.

3. The cobalt complex compound according to claim 1 of the formula

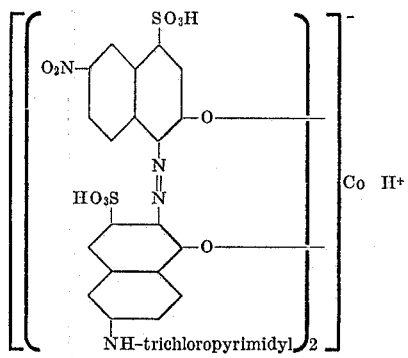

4. The cobalt complex compound according to claim 2 of the formula

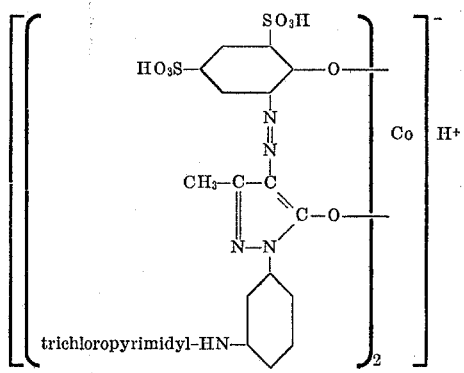

5. The chromium complex compound according to claim 1 of the formula

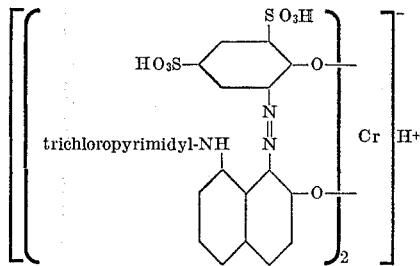

6. The chromium complex compound according to claim 2 of the formula

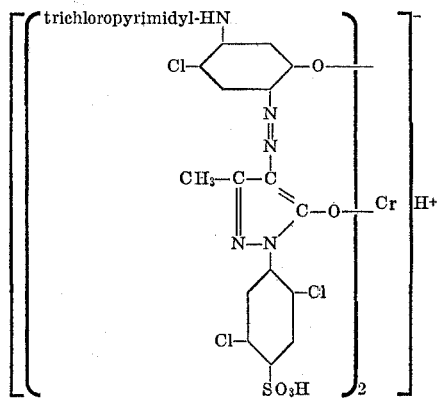

(References on following page)

References Cited

UNITED STATES PATENTS

| | | | |
|---|---|---|---|
| 2,836,587 | 5/1958 | Buehler et al. | 260—147 |
| 2,929,809 | 3/1960 | Menzi et al. | 260—146 |
| 3,288,776 | 11/1966 | Benz et al. | 260—146 |
| 3,342,798 | 9/1967 | Dussy et al. | 260—146 |
| 1,886,480 | 11/1932 | Haller et al. | 260—154 |
| 2,935,506 | 5/1960 | Heslop et al. | 260—154 |
| 3,127,389 | 3/1964 | Seitz et al. | 260—146 |

FLOYD D. HIGEL, Primary Examiner

U.S. Cl. X.R.

8—4, 13, 42, 43, 63, 71; 260—37, 145, 147, 151, 154, 198, 199; 117—138.8